United States Patent
Porembski et al.

(10) Patent No.: US 10,065,657 B2
(45) Date of Patent: Sep. 4, 2018

(54) SYSTEM AND METHOD FOR APPLYING VEHICLE SETTINGS TO A VEHICLE

(71) Applicant: Honda Motor Co., Ltd., Tokyo (JP)

(72) Inventors: Joseph P. Porembski, Columbus, OH (US); Daniel Galano, Miramar, FL (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/827,431

(22) Filed: Aug. 17, 2015

(65) Prior Publication Data
US 2017/0050645 A1    Feb. 23, 2017

(51) Int. Cl.
| B60W 50/08 | (2012.01) |
|---|---|
| B60R 16/037 | (2006.01) |
| H04W 4/04 | (2009.01) |
| B60W 50/00 | (2006.01) |

(52) U.S. Cl.
CPC ......... B60W 50/085 (2013.01); B60R 16/037 (2013.01); H04W 4/046 (2013.01); *B60W 2050/0064* (2013.01)

(58) Field of Classification Search
CPC ........... B60W 50/085; B60W 2540/04; B60W 2050/0064; B60R 16/037; H04W 4/046
See application file for complete search history.

(56) References Cited

U.S. PATENT DOCUMENTS

| 6,104,101 A | 8/2000 | Miller et al. |
|---|---|---|
| 6,198,996 B1 | 3/2001 | Berstis |
| 6,205,374 B1 * | 3/2001 | Kljima .................. B60G 17/016 307/10.4 |
| 6,663,010 B2 | 12/2003 | Chene et al. |
| 7,170,400 B2 | 1/2007 | Cowelchuk et al. |
| 8,269,601 B2 | 9/2012 | Burzio |
| 8,498,757 B2 | 7/2013 | Bowden et al. |
| 8,825,222 B2 | 9/2014 | Namburu et al. |
| 2001/0013833 A1 * | 8/2001 | Chen ..................... B60R 25/104 340/4.32 |
| 2004/0044454 A1 * | 3/2004 | Ross ................... B60R 16/0231 701/36 |
| 2005/0221878 A1 | 10/2005 | Van Bosch et al. |
| 2007/0255464 A1 | 11/2007 | Singh et al. |
| 2008/0059024 A1 * | 3/2008 | Hara ................... B60R 16/0231 701/36 |

(Continued)

FOREIGN PATENT DOCUMENTS

WO   2013130036   9/2013

*Primary Examiner* — Alan D Hutchinson
(74) *Attorney, Agent, or Firm* — Rankin, Hill & Clark LLP (57) ABSTRACT

A method and system for applying vehicle settings to a vehicle is provided. The method and system include determining if a portable device is connected to the vehicle. The method and system also include identifying a first settings profile that is linked to the portable device upon determining that an auto-link functionality is enabled on the vehicle. The method and system further include determining if a user input is received to link a second settings profile to the portable device and identifying the second settings profile that is linked to the portable device. The method and system also include applying a settings profile to control a vehicle system during a current drive cycle of the vehicle, wherein the settings profile applied to control a vehicle system includes the first settings profile or the second settings profile.

18 Claims, 4 Drawing Sheets

(56) References Cited

U.S. PATENT DOCUMENTS

| | | | |
|---|---|---|---|
| 2008/0309454 A1* | 12/2008 | Tsuji | B60R 25/2081 |
| | | | 340/5.6 |
| 2013/0124009 A1 | 5/2013 | Esler | |
| 2014/0309863 A1* | 10/2014 | Ricci | G01C 21/3484 |
| | | | 701/36 |
| 2014/0365694 A1* | 12/2014 | Bolton | H04W 80/02 |
| | | | 710/106 |
| 2015/0051754 A1* | 2/2015 | Kwon | B60K 35/00 |
| | | | 701/2 |
| 2016/0191704 A1* | 6/2016 | MacInnes | H04M 3/42144 |
| | | | 455/411 |

* cited by examiner

SYSTEM AND METHOD FOR APPLYING VEHICLE SETTINGS TO A VEHICLE

BACKGROUND

Many vehicles today include vehicle systems and features that can be adjusted based on user preferences associated with one or more drivers and/or passengers. The user preferences can be used to adjust various settings of the features of vehicle systems in order to provide a customized environment within the vehicle for the driver and/or passenger. In many instances, a vehicle is shared by multiple drivers who can use a single key fob to access and operate the vehicle. In addition, each driver has a different set of driver settings that need to be adjusted within the vehicle based on which driver is operating the vehicle. In some cases, the drivers modify the vehicle settings already implemented within the vehicle. Determining which set of driver settings to apply can be a complicated process especially when multiple drivers of the vehicle each use and modify driver settings to be applied to the same vehicle.

BRIEF DESCRIPTION

According to one aspect, a method for applying vehicle settings to a vehicle is provided. The method includes determining if a portable device is connected to the vehicle. The method also includes identifying a first settings profile that is linked to the portable device that is connected to the vehicle upon determining that an auto-link functionality is enabled on the vehicle. The method further includes determining if a user input is received to link a second settings profile to the portable device that is connected to the vehicle and identifying the second settings profile upon determining that the user input is received to link the second settings profile to the portable device that is connected to the vehicle. The method additionally includes applying a settings profile to control a vehicle system during a current drive cycle of the vehicle, wherein the settings profile applied to control a vehicle system includes the first settings profile or the second settings profile.

According to another aspect, a system for applying vehicle settings to a vehicle is provided. The system includes a vehicle auto-link control application that is executed on a head unit of the vehicle. The system also includes an auto-link interface module that is included as a module of the vehicle auto-link control application that determines if an auto-link functionality is enabled on the vehicle when a portable device is connected to the vehicle. The system further includes, settings profile identification module that is included as a module of the vehicle auto-link control application that identifies a first settings profile is linked to the portable device that is connected to the vehicle upon the auto-link interface module determining that the auto-link functionality is enabled on the vehicle. The auto-link interface module determines if a user input is received to link a second settings profile to the portable device that is connected to the vehicle and the settings profile identification module identifies the second settings profile upon determining that the user input is received to link the second settings profile to the portable device that is connected to the vehicle. The system additionally includes, a vehicle control module that is included as a module of the vehicle auto-link control application that applies a settings profile to control a vehicle system during a current drive cycle of the vehicle, wherein the vehicle control module applies the first settings profile or the second settings profile.

According to still another aspect, a computer readable medium is provided including instructions that when executed by a processor executes a method for applying vehicle settings to a vehicle. The instructions include determining if a portable device is connected to the vehicle. The instructions also include identifying a first settings profile that is linked to the portable device that is connected to the vehicle upon determining that an auto-link functionality is enabled on the vehicle. The instructions further include determining if a user input is received by a user to link a second settings profile to the portable device that is connected to the vehicle and identifying the second settings profile upon determining that the user input is received to link the second settings profile to the portable device that is connected to the vehicle. The instructions additionally include applying a settings profile to control a vehicle system during a current drive cycle of the vehicle, wherein the settings profile applied to control a vehicle system includes the first settings profile or the second settings profile.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

The following includes definitions of selected terms employed herein. The definitions include various examples and/or forms of components that fall within the scope of a term and that may be used for implementation. The examples are not intended to be limiting.

A "processor," as used herein, processes signals and performs general computing and arithmetic functions. Signals processed by the processor may include digital signals, data signals, computer instructions, processor instructions, messages, a bit, a bit stream, or other computing that may be received, transmitted and/or detected.

A "bus,' as used herein, refers to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a vehicle bus that interconnects components inside a vehicle using protocols such as Controller Area network (CAN), Media Oriented System Transport (MOST), Local Interconnect Network (LIN), among others.

A "memory," as used herein may include volatile memory and/or nonvolatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM).

A "module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module can also include logic, a software controlled microprocessor, a discrete logic circuit, an analog circuit, a digital circuit, a programmed logic device, a memory device containing executing instructions, logic gates, a combination of gates, and/or other circuit components. Multiple modules can be combined into one module and single modules can be distributed among multiple modules.

An "operable connection," as used herein may include a connection by which entities are "operably connected", is one in which signals, physical communications, and/or logical communications may be sent and/or received. An operable connection may include a physical interface, a data interface and/or an electrical interface.

A "vehicle," as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, personal watercraft, and aircraft. In some cases, a motor vehicle includes one or more engines.

An "input device" as used herein may include devices for controlling different vehicle features which are include various vehicle components, systems, and subsystems. The term "input device" includes, but it not limited to: push buttons, rotary knobs, and the like. The term "input device" additionally includes graphical input controls that take place within a user interface which may be displayed by various types of mechanisms such as software and hardware based controls, interfaces, or plug and play devices.

An "output device" as used herein may include devices that may derive from vehicle components, systems, subsystems, and electronic devices. The term "output devices" includes, but is not limited to: display units, and other devices for outputting information and functions.

I. System Overview

Figure 1:
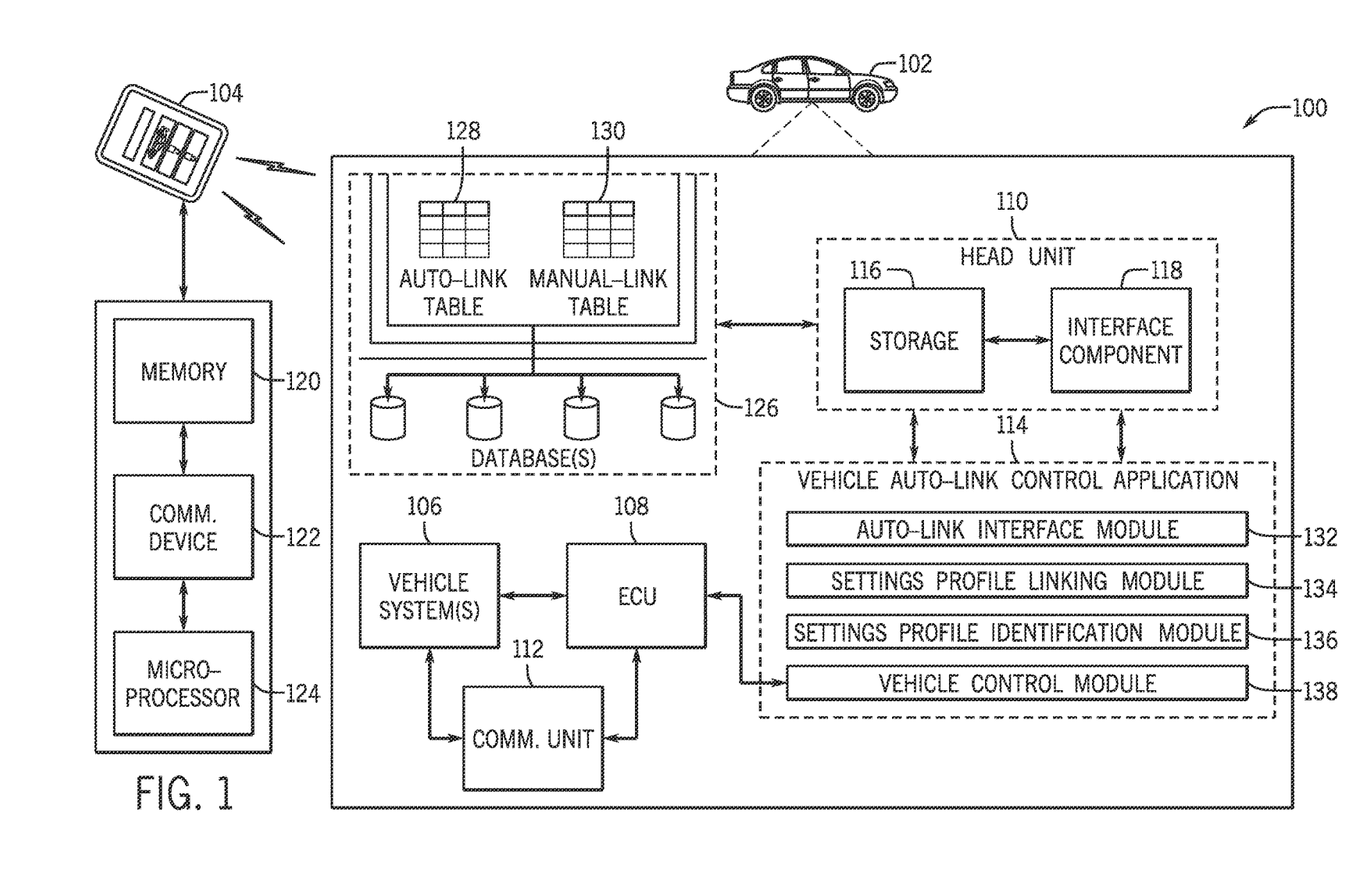
FIG. 1 is a schematic view of a system for applying vehicle settings in a vehicle according to an exemplary embodiment.

Referring now to the drawings, wherein the showings are for purposes of illustrating one or more exemplary embodiments and not for purposes of limiting the same, FIG. 1 is a schematic view of a system for applying vehicle settings in a vehicle according to an exemplary embodiment. The system, which can also be referred to as a settings profile auto-link system, is generally designated by reference numeral 100. As described in more detailed below, the settings profile auto-link system 100 can provide users (e.g., one or more drivers, passengers, occupants, operators, etc.) of a vehicle 102 with the ability to use one or more portable device(s) 104 to automatically access and apply a user's settings profile within the vehicle 102. The user's settings profile can be executed to adjust programmable settings of one or more vehicle systems 106.

In an exemplary embodiment, the settings profile auto-link system 100 can apply the user's settings profile by identifying the user's settings profile that is linked (associated) to one or more portable device(s) 104, used by the user and connected to the vehicle 102. Additionally, the system 100 facilitates an alternate user (e.g., another user) to link an alternate settings profile to the one or more portable device(s) 104 in order to apply the alternate settings profile to the vehicle 102 and adjust programmable settings of one or more vehicle systems 106 per the alternate user's preferences. The components of the system 100, as well as the components of other systems, hardware architectures, and software architectures discussed herein, can be combined, omitted or organized into different architecture for various embodiments. However, the exemplary embodiments discussed herein focus on the environment as illustrated in FIG. 1, with corresponding system components, and related methods.

In the embodiment shown in FIG. 1, the vehicle 102 of the settings profile auto-link system 100 includes the one or more vehicle systems 106, an electronic control unit (ECU) 108, a head unit 110, and a communication unit 112. In an exemplary embodiment, the ECU 108 controls the vehicle system(s) 106 based on one or more signals sent from vehicle sensors (not shown), the vehicle systems 106, and vehicle applications (that can be executed on the head unit 110). In one embodiment, the ECU 108 can include internal processing memory, an interface circuit, and bus lines for transferring data, sending commands, and communicating with the one or more vehicle systems 106. Generally, the ECU 108 includes a processor and memory (not shown).

In one embodiment, as described in more detail below, the ECU 108 operably controls the one or more vehicle systems 106 based on the application of each user's settings profile by a vehicle auto-link control application 114. The vehicle auto-link control application 114 can be stored and executed on the head unit 110 of the vehicle 102. The vehicle systems 106 can include, but are not limited to an audio system, climate control system, infotainment system, navigation system, telecommunications system, vehicle ergonomics system, vehicle safety system, etc. The vehicle systems 106 can also include one or more programmable settings that can be adjusted in order to provide users of the vehicle 102 with individual customized variable preferences that are adjusted based on the application of the settings profile by the vehicle auto-link control application 114. For example, the vehicle auto-link control application 114 can apply a driver's settings profile in order to adjust settings that include audio system options, navigation system options, seat positioning options, mirror positioning options, lighting options, door lock options, audio alerts, visual alerts, etc., based on the driver's preferences.

In an exemplary embodiment, the head unit 110 of the vehicle 102 can store hardware and software related to the vehicle system (s) 106. In one embodiment, the head unit 110 includes a controller (not shown) that controls the processes of the head unit 110. In another embodiment, the head unit 110 can be controlled by the ECU 108 of the vehicle 102. The head unit 110 can also include a storage 116 that can include various types of memory, as described above. The storage 116 can store and execute software corresponding to one or more vehicle systems 106 that are included as part of the head unit 110 and/or throughout the vehicle 102. For instance, the storage 116 can store one or more operating systems, applications, application files, vehicle system and subsystem interface data, and the like that can be executed by the controller of the head unit 110 and/or the ECU 108.

In an exemplary embodiment, the storage 116 of the head unit 110 can store one or more data files that can be utilized by one or more applications that are executed by the controller of the head unit 110 and/or the ECU 108 in order to adjust programmable settings of the vehicle system(s) 106. For example, as discussed in more detail below, the storage 116 of the head unit 110 can store one or more settings profiles (e.g., data files) that can be utilized by the vehicle auto-link control application 114 in order to adjust the settings of one or more vehicle systems 106.

The head unit 110 can also include an interface component 118. The interface component 118 can receive one or more user inputs from one or more users. For example, the interface component 118 can receive one or more user inputs indicative of a command, a selection, a media selection, or media command. The interface component 118 may enable a user, such as a driver or occupant, to interact with or provide input to applications that can operate the vehicle system(s) 106. As an example, the interface component 118 can include (types of interface components 118 not shown) a touch screen, a touchpad, a trackpad, one or more hardware buttons, one or more buttons, such as one or more soft buttons, one or more software buttons, one or more interactive buttons, one or more switches, a keypad, a microphone, one or more sensors, or other human-machine interface (HMI), etc.

In one or more embodiments, the interface component 118 may be implemented in a manner which integrates a display such that the interface component 118 both provides an output and receives inputs (e.g., user inputs). For example, the interface component 118 can include a display unit (not shown) that can be included as one of the vehicle systems 106, installed on the head unit 110 or can be a stand-alone component. The display unit can display one or more user interfaces that are executed from one or more operating systems, applications, etc., that are stored on the storage 116 of the head unit 110. The display unit can include a touch screen that can receive touch inputs from the one or more users within the vehicle 102.

As mentioned above, the vehicle 102 also includes the communication unit 112 that is capable of providing wired or wireless computer communications using various protocols to send/receive electronic signals within the vehicle 102 and to external devices including the one or more portable device(s) 104 that are connected to the communication unit 112 (e.g., through a Bluetooth® connection, radio frequency connection, proximity sensing connection, etc.). Additionally, the communication unit 112 is operably connected for internal computer communication via a bus (e.g., a Controller Area Network (CAN) or a Local Interconnect Network (LIN) protocol bus) to facilitate data input and output between the components of the vehicle 102. For instance, the communication unit 112 can send data internally within the vehicle 102 between the ECU 108, the head unit 110, the one or more vehicle systems 106, and other vehicle components (not shown).

The portable device(s) 104 of the system 100 can include, but is not limited to, an electronic key fob, a vehicle remote, a smart key, an electronic key chain, a handheld device, a mobile communication device, a smart phone, a laptop, a tablet, an e-reader and the like. In one or more embodiments, the portable device(s) 104 can be used to access (e.g., lock/unlock vehicle doors) or operate (enable/disable vehicle ignition) the vehicle 102. The portable device(s) 104 can be associated to the vehicle 102 by a manufacturer of the vehicle 102 or the manufacturer of the portable device(s) 104. For example, the vehicle 102 can be associated to two key fobs (i.e., portable devices 104) that are specifically provided by the manufacturer of the vehicle 102.

In an exemplary embodiment, the portable device(s) 104 can include a memory 120, a communication device 122, a micro-processor 124, and one or more user input buttons (not shown). The micro-processor 124 can include memory, an interface circuit, and bus lines, for transferring data, sending commands, communicating with the various components and controlling an overall operation of the portable device(s) 104. As described in more detail below, in one embodiment, the micro-processor 124 can control the communication device 122 to send/ receive one or more electronic signals to/from the ECU 108 of the vehicle 102 in order to access the vehicle 102, operate the vehicle 102, operate functions of the vehicle system(s) 106, and identify the settings profile in order to adjust the programmable settings of the vehicle system(s) 106 through the vehicle auto-link control application 114.

The memory 120 of the portable device(s) 104 can store a device identification (ID) file (device ID) that is associated to the portable device(s) 104 allowing the vehicle 102 to identify the portable device(s) 104 connected to the vehicle 102. In one embodiment, the device ID of each portable device(s) 104 can include a unique identification code. For example, the device ID of a first key fob associated to the vehicle 102 can be '0001' and the device ID of a second key fob associated to the vehicle 102 can be '0002', etc. In another embodiment, the device ID of each portable device(s) 104 can include a serial number corresponding to the portable device(s) 104 that is assigned by a manufacturer of the vehicle 102 or the manufacturer of the portable device(s) 104.

The communication device 122 of the portable device(s) 104 can include, but is not limited to, a transceiver (not shown) that is capable of providing wireless computer communications using various protocols to send/receive electronic signals to external devices including the communication unit 112 of the vehicle 102. The electronic signals can include command signals to control one or more vehicle systems 106 and/or components. In one embodiment, the electronic signals can include polling signals that are sent to the vehicle 102 in order to determine if the portable device(s) 104 is in a predetermined vicinity of the vehicle 102. In another embodiment, the electronic signals can include polling response signals to communicate the receipt of a polling signal from the vehicle 102 to confirm the existence or presence of the portable device(s) 104 in a predetermined vicinity of the vehicle 102.

In an exemplary embodiment, the storage 116 of the head unit 110 can store a digital portable device association list (not shown) that lists one or more device IDs of portable device(s) 104 that are associated to the vehicle 102 (e.g., by the vehicle manufacturer). The portable device association list can be pre-stored by the manufacturer of the vehicle 102 with the one or more device IDs of one or more portable device(s) 104 that are associated to the vehicle 102.

In some embodiments, when the portable device(s) 104 enters into a communication range of the vehicle 102 wherein the communication device 122 can communicate with the communication unit 112 of the vehicle 102 (e.g., via Bluetooth®, radio frequency, or proximity sensing), the micro-processor 124 can send a command to the communication device 122 to send (e.g., transmit) the device ID of the portable device(s) 104 to the communication unit 112 of the vehicle 102. Upon receiving the device ID, the communication unit 112 can send the device ID to the head unit 110 to determine if a matching device ID is included within the portable device association list stored on the storage 116. When the head unit 110 determines that a matching device ID is included within the portable device association list, the portable device(s) 104 (with the matching device ID) is determined to be an associated portable device(s) 104 that is connected to the vehicle 102.

In other embodiments, the communication unit 112 of the vehicle 102 can transmit the periodic polling signal to the portable device(s) 104 in order to determine if/when the portable device(s) 104 enters into a communication range of the vehicle 102. Upon the communication device 122 of the portable device(s) 104 receiving the periodic polling signal, the micro-processor 122 can send a command to the communication device 122 to retrieve the device ID from the memory 120 in order to send (e.g., transmit) the device ID to the communication unit 112 to be further analyzed by the head unit 110, as described above.

The system 100 of FIG. 1 additionally includes one or more databases 126. The database(s) 126 can include one or more database tables that can be accessed by one or more applications executed on the head unit 110 to store and/or retrieve one or more database records. The one or more database records can contain data that is retrieved and applied by the one or more applications within the vehicle 102 including the vehicle auto-link control application 114.

In an exemplary embodiment, the database(s) 126 can be hosted on the storage 116 of the head unit 110. Specifically, the storage 116 of the head unit 110 can include a database server computing program that can provide database services to the head unit 110, the ECU 108, applications, operating systems, etc. within the vehicle 102. In an alternate embodiment, the database(s) 126 can be hosted externally from the vehicle 102 on an external server infrastructure (not shown) that include one or more database servers, web servers, data servers, domain controllers, backup servers, etc. The external server infrastructure can be accessed by the communication unit 112 of the vehicle 102 via a wireless (e.g., GSM, CDMA, GPRS, Wi-Fi, WiMax, 3G, and/or LTE) connection through an internet cloud. In another embodiment, the external server infrastructure can be accessed by the communication device 122 of the portable device(s) 104 (e.g., LTE connection) and data to/from the database(s) 126 can be forwarded from the communication device 122 to the communication unit 112 of the vehicle 102 (e.g., via a Bluetooth® connection). As described in more detail below, in an exemplary embodiment, the vehicle auto-link control application 114 can access the database(s) 126 through the communication unit 112 in order to create new records, update records, and query records on one or more database tables that can be specifically allocated to the vehicle auto-link control application 114.

In an exemplary embodiment, the vehicle auto-link control application 114 can be executed on the head unit 110 of the vehicle 102 and can be accessed by the user via the interface component 118 of the head unit 110. In another embodiment, the vehicle auto-link control application 114 can be a remote software application that is installed directly onto the portable device(s) 104 that interfaces with a host software application that is executed on the head unit 110 of the vehicle 102. In yet another embodiment, the vehicle auto-link control application 114 and/or one or more modules of the vehicle 102 auto-link application can be executed on the aforementioned external server infrastructure and can be accessed by the communication unit 112 of the vehicle 102 and/or the communication device 122 of the portable device(s) 104 to be accessed by the head unit 110 of the vehicle 102.

The vehicle auto-link application 114 can allow one or more users to create/update his/her settings profile and link (e.g., associate) his/her settings profile to one or more of the portable device(s) 104. Additionally, the application 114 can also allow one or more users to link his/her settings profile to a vehicle control account that the user uses to login to the application 114. As described in more detail below, the vehicle auto-link application 114 can provide an auto-link functionality that automatically applies the user's settings profile that is linked to one or more portable device(s) 104 based on the connection of the one or more portable device(s) 104 to the vehicle 102. Additionally, the vehicle auto-link application 114 can provide a manual-link functionality that applies the user's settings profile based on the login to the user's vehicle control account that is linked to the user's settings profile. The manual-link functionality can be employed when the auto-link functionality of the application 114 is disabled.

In one embodiment, the vehicle auto-link application 114 allows the user to enable or disable auto-link functionality. When enabled, during each drive cycle of the vehicle 102 (e.g., each time the vehicle ignition switch is turned to an accessory power or ON mode), the user's settings profile can be automatically determined and applied by the application 114 when the portable device 104 linked to the user's settings profile is connected to the vehicle 102. In addition, the vehicle auto-link application allows the settings profile associated to the portable device(s) 104 to be switched from one user's settings profile to another user's settings profile in order to be applied at each drive cycle of the vehicle 102. As an illustrative example, Mr. A and Mrs. A both use a first portable device 104 to access and operate the vehicle 102. Mr. A can link his settings profile to the first portable device 104 when he operates the vehicle 102 to apply his settings profile and adjust the programmable settings of the vehicle system(s) 106 per his preferences. Once associated, whenever the first portable device 104 is used to access or operate the vehicle 102 (e.g., the first portable device 104 connects to the vehicle 102), Mr. A's settings profile will be applied via the auto-link functionality. However, the vehicle auto-link control application 114 can be used by Mrs. A to link her settings profile to the first portable device 104. Once Mrs. A links her settings profile to the first portable device 104, whenever the first portable device 104 is used to access or operate the vehicle 102, Mrs. A's settings profile will be applied via the auto-link functionality. Therefore, the vehicle auto-link control application 114 ensures that the user's settings profile that is last linked to the connected portable device(s) 104 is applied each time the vehicle 102 is used until a different settings profile is linked to the connected portable device(s) 104.

In an exemplary embodiment, the settings profiles can be created in the form of a data file that contains programming code that can be interpreted by the ECU 108 and/or the head unit 110 of the vehicle 102. The programmable code of the settings profile can include one or more user preferences that can be interpreted to adjust programmable settings of the one or more vehicle systems 106. For example, such programmable settings can include, but are not limited to, audio system options, navigation system options, climate control options, seat positioning options, mirror positioning options, lighting options, door lock options, audio alerts, visual alerts, seat belt heights, steering wheel heights, pedal positions, lighting colors/intensity, airbag activation, sensitivity conditions, and the like.

The vehicle auto-link control application 114 can use one or more labels to identify settings profiles and vehicle control accounts in order to create, update, query, and retrieve records on the tables on the database(s) 126. As mentioned above, the database(s) 126 records a link (e.g., association) between the settings profile and a device ID of the portable device 104 or a label of a vehicle control account. Specifically, as described in more detail below, the link recorded on one or more tables on the database(s) 126 can be used by the application 114 to identify the settings profile linked to one or more portable devices 104. Additionally, the link recorded can also be used by the application 114 to identify a settings profile linked to the user's vehicle control account. Therefore, each settings profile can include a label that identifies the settings profile. As described below, the label can include a name of the settings profile that is chosen by the user during the creation/update of his/her settings profile.

The vehicle auto-link control application 114 will now be described in more detail. The vehicle auto-link control application includes an auto-link interface module 132, a settings profile linking module 134, a settings profile identification module 136, and a vehicle control module 138. The auto-link interface module 132 can present one or more graphical user interfaces, user interface input icons, user interface lists, web based user interfaces, command line interfaces, touch interfaces, etc. on the interface component 118 to be used by one or more users within the vehicle 102. In one embodiment, the auto-link interface module 132 can present one or more user interfaces via the interface component 118 in order for the vehicle auto-link control application 114 to receive inputs from users and provide outputs to users.

In one embodiment, upon the user launching the vehicle auto-link control application 114 within the vehicle 102, the auto-link interface module 132 can present the user with a vehicle control account login prompt via the interface component 118. The vehicle control account login prompt can be used to enter user credentials (username and passcode) in order to login to the vehicle auto-link control application 114. In one embodiment, the vehicle control account login-prompt can also include a link to create a new vehicle control account for first time users of the vehicle auto-link control application 114. During the account creation process, the user can be prompted to create user credentials that can be used in order to provide security clearance and access to the application 114. Upon creation of the user's vehicle control account, the auto-link interface module 132 can use the username included within the user credentials as a label that can be utilized by other modules of the application 114 in order to link the user's settings profile to his/her vehicle control account. Therefore, every vehicle control account associated to each user includes a label that is created within one or more tables of the database(s) 126 in order to identify the user logging into the vehicle auto-link control application 114.

Once the user logs-in to his/her vehicle control account using the user credentials, the auto-link interface module 132 can present the user with an auto-link user interface (via the interface component 118). The auto-link user interface can be used by the user to create a new settings profile or update a pre-existing settings profile (that was previously created by the user) in order adjust programmable features of the vehicle system(s) 106. Upon creation of the settings profile, the auto-link interface module 132 can present the user with a prompt to name the settings profile. In one embodiment, the auto-link interface module 132 can use the name of the settings profile (as created by the user) as a label that can be utilized by other modules of the application 114 in order to identify the settings profile.

Upon the user launching the vehicle auto-link control application 114, one or more modules of the application 114 can connect to the database(s) 126. In one embodiment, the modules 132, 134, 136 can access the databases 126 directly on the head unit 110 of the vehicle 102. In another embodiment, the modules 132, 134, 136 can access the databases 126 (via the communication unit 112) that reside externally from the vehicle 102 on the external server infrastructure.

In one embodiment, the database(s) 126 can include a vehicle auto-link control table 128 and a vehicle manual-link control table 130. One or more modules 132, 134, 136 of the vehicle auto-link control application 114 can access the database(s) 126 in order to create new records, update records, and query records within the vehicle auto-link control table 128 and/or vehicle manual-link control table 130 of the database(s) 126. Specifically, as described in more detail below, the one or more modules 132, 134, 136 can access the vehicle auto-link control table 128 when the auto-link functionality is enabled (by the user). Otherwise, the one or more modules 132, 134, 136 can access the vehicle manual-link table 130 when the auto-link functionality is disabled (by the user). In an alternate embodiment, the vehicle auto-link table 128 and the vehicle manual-link table 130 can be included within a consolidated single database table that can include specific record types that correspond to the content of each record. For example, the consolidated single database table can include records that are classified as auto-link records and manual-link records.

The vehicle auto-link control table 128 and/or the vehicle manual-link control table 130 can include a collection of related data held in a structured format within the database(s) 126. Specifically, the vehicle auto-link control table 128 and/or the vehicle manual-link control table 130 can include records that can reside within rows and columns of the tables 128, 130. In one embodiment, the one or more records of the vehicle auto-link control table 128 can contain the label of a settings profile that is linked to the device ID of one of the portable device(s) 104 in order to apply the settings profile. For example, a record can contain a device ID that is linked to a label of the settings profile as [Dev.ID=0001:SP.Lbl=Mr. A's Profile]. In some embodiments, the one or more records of the vehicle manual-link control table 130 can contain the label of a settings profile that corresponds to the label of the user's vehicle control account. For example, a record can contain the label of a vehicle control account that is linked to a label of the settings profile as [VCA.Lbl:Mr.A:SP.Lbl=Mr. A's Profile].

II. Linking the Settings Profile

The process of linking a user's settings profile to one or more portable devices 104 and/or a user's vehicle control account will now be discussed in detail. In an exemplary embodiment, the settings profile linking module 134 of the vehicle auto-link control application 114 can operate when the user uses the auto-link user interface to create/update a settings profile. In one embodiment the settings profile linking module 134 can populate the vehicle control auto-link table 128 and/or the vehicle control manual-link table 130 with data that can be utilized by the application 114 in order to identify and apply the user's settings profile.

Figure 2:
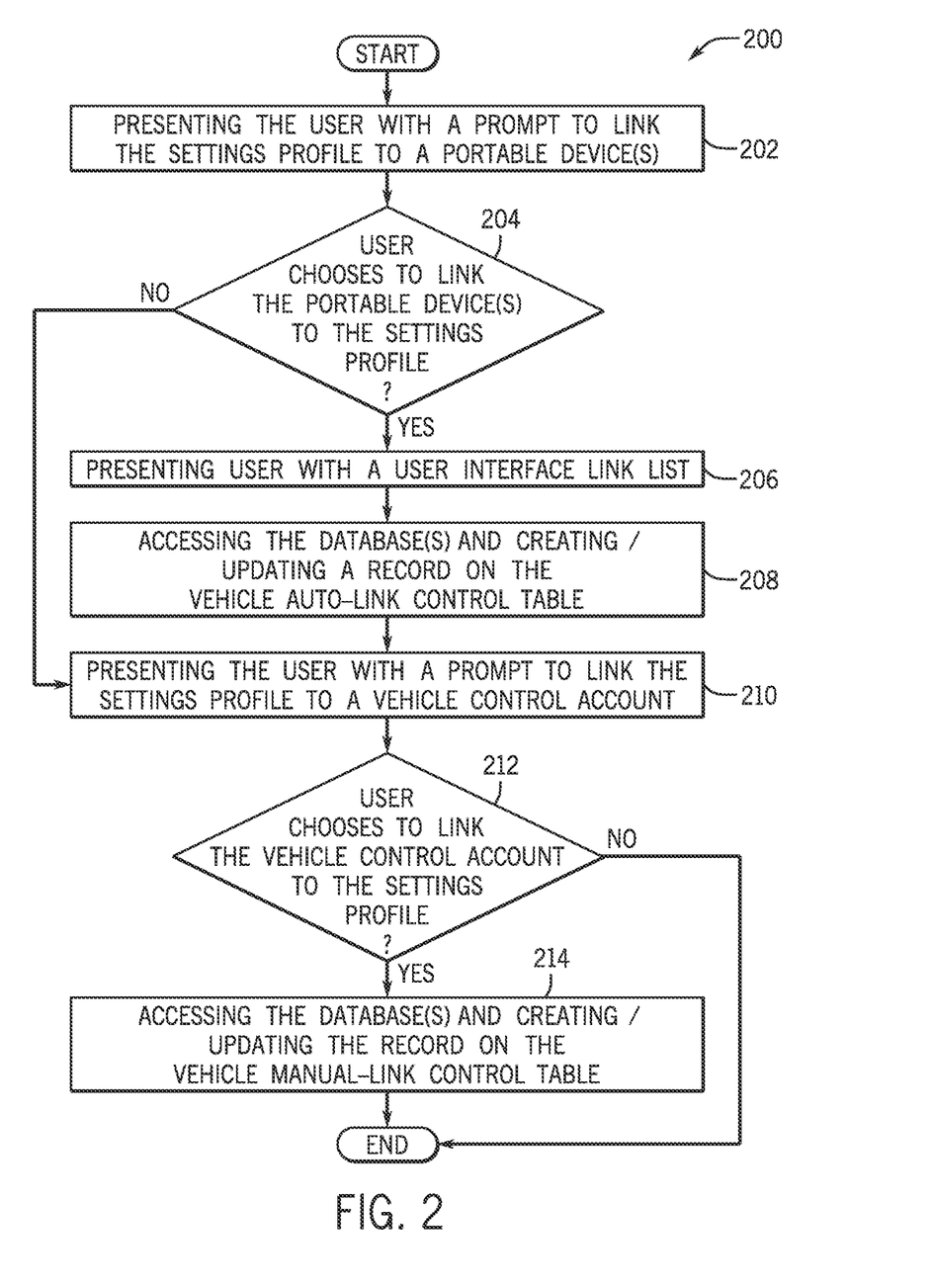
FIG. 2 is a process flow diagram of a method to link a created/updated settings profile to a portable device and/or a vehicle control account, according to an exemplary embodiment.

Referring now to FIG. 2, a process flow diagram of a method 200 to link a created/updated settings profile to portable device(s) 104 and/or a vehicle control account is illustrated. FIG. 2 will be described with reference to the components of FIG. 1, though it is to be appreciated that the method of FIG. 2 can be used with other systems and/or components. At block 202, the method includes presenting the user with a prompt to link the settings profile to a portable device(s) 104. In one embodiment, when the user accesses and uses the auto-link user interface to create his/her settings profile, the auto-link interface module 132 can present the prompt to the user to link a settings profile to a device ID of the portable device(s) 104. In some embodiments, when the user accesses and uses the auto-link user interface to update his/her pre-existing settings profile via the auto-link user interface, the auto-link interface module 132 can present a prompt on the auto-link user interface asking the user if he/she would like to link a different portable device(s) 104 to the settings profile.

At block 204, the method includes determining if the user chooses to link the portable device(s) 104 to the settings profile. In some embodiments, the settings profile linking module 130 determines if the user chooses to link the device ID(s) of the portable device(s) 104 to his/her settings profile via the prompt that was presented to the user upon creation/update of his/her settings profile on the auto-link user interface. Upon the user providing an input on the prompt to link his/her settings profile to the portable device(s) 104, the auto-link interface module 132 can provide a corresponding signal to the settings profile linking module 134.

If it is determined that the user chooses to link the portable device(s) 104 to the settings profile (at block 204), at block 206, the method includes presenting the user with a user interface link list. In one embodiment, when the user chooses to link his/her newly created settings profile to the portable device(s) 104, the auto-link interface module 132 can access the aforementioned portable device association list from the storage 116 of the head unit 110 in order to retrieve one or more device IDs of one or more portable device(s) 104 that are associated to the vehicle 102. The auto-link interface module 132 can present the user with the user interface link list that lists of one or more device IDs of the one or more associated portable device(s) 104 to the user. The user can select (e.g., via user input) one or more device IDs of one or more portable devices on the user interface link list to be linked to the user's settings profile. On the other hand, when the user chooses to link his/her pre-existing settings profile to an alternate portable device(s) 104, the auto-link interface module 132 can present the user with the user interface link list to allow the user to link his/her settings profile to the device ID(s) of the alternate portable device(s) 104.

At block 208, the method includes accessing the database(s) 126 and creating/updating a record on the vehicle auto-link control table 128. In some embodiments, the settings profile linking module 134 accesses the vehicle auto-link control table 128 on the database(s) 126 hosted on the storage 116 of the head unit 110. In other embodiments, the settings profile linking module 134 can access the vehicle auto-link control table 128 on the database(s) 126 hosted on the aforementioned external server infrastructure.

In an exemplary embodiment, when the user creates the newly created settings profile via the auto-link user interface, upon accessing the database(s) 126, the settings profile linking module 134 creates a new database record within the vehicle auto-link control table 128. The new database record can contain the device ID(s) of the portable device(s) 104 (that the user linked on the user interface link list) that is linked to the label of the user's settings profile (e.g., [Dev.ID=0001:SP.Lbl=Mr. A's Profile]).

On the other hand, when the user updates his/her pre-existing settings profile the settings profile linking module 134 can query the vehicle auto-link control table 128 for the record that contains the label of the user's settings profile. Upon finding the record that contains the label of the user's settings profile, the settings profile linking module 134 can update the record containing the device ID of the alternate portable device(s) 104 that the user chooses to link (e.g., [Dev.ID=0002:SP.Lbl=Mr. A's Profile]).

If it is determined that the user does not choose to link a portable device(s) 104 to the settings profile (at block 204) or the record of the new/updated settings profile is created/updated on the vehicle auto-link control table 128 (at block 208), the method proceeds to block 210, wherein the method includes presenting the user with a prompt to link the settings profile to a vehicle control account. In one embodiment, when the user accesses and uses the auto-link user interface to create/update his/her settings profile, the auto-link interface module 132 can present the prompt to the user to link the settings profile his/her vehicle control account (that the user logged in to access the vehicle auto-link control application 114).

At block 212, the method includes determining if the user chooses to link the vehicle control account to the settings profile. In some embodiments, the auto-link interface module 132 determines if the user chooses to link his/her vehicle 102 control account to his/her settings profile via the prompt that was presented to the user upon creation/update of his/her settings profile on the auto-link user interface. As described in more detail below, in one embodiment, when the user chooses to disable the auto-link functionality of the vehicle auto-link control application 114, the user can use his/her vehicle control account to apply his/her settings profile.

If it is determined that the user chooses to link the vehicle control account to the settings profile (at block 212), at block 214, the method includes accessing database(s) 126 and creating/updating the record on the vehicle manual-link control table 130. In an exemplary embodiment, when the user creates a new settings profile via the auto-link user interface, the settings profile linking module 134 creates a new database record within the vehicle manual-link control table 130 that contains the label of the user's vehicle control account that is linked to the label of the user's settings profile (e.g., [VCA.Lbl:Mr.A:SP.Lbl=Mr. A's Profile).

III. Identifying and Applying the Linked Settings Profile

The process of identifying and applying the user's settings profile linked to one or more portable devices 104 and/or a user's vehicle control account will now be discussed in detail. Referring again to FIG. 1, the settings profile identification module 136 of the application 114 can determine the settings profile that is to be applied based on the connection of the linked portable device(s) 104 to the vehicle 102 or the linked vehicle control account that is logged in by the user. In some embodiments, the settings profile identification module 136 can access the vehicle auto-link control table 128 and/or the vehicle manual-link control table 130 within the database(s) 126 hosted on the storage 116. In other embodiments, the settings profile identification module 136 can access the vehicle auto-link control table 128 and/or the vehicle manual-link control table 130 on the databases 126 hosted on the external server infrastructure.

In one or more embodiments, when the auto-link functionality is enabled, the settings profile identification module 136 can query the vehicle auto-link control table 128 in order to determine the label of the settings profile that is linked to the device ID of the connected portable device(s) 104. In an event that the user wishes to link a different settings profile to the portable device(s) 104, the settings profile identification module 136 can also utilize the settings profile linking module 134 to update the database record containing the device ID of the portable device(s) 104 with the label of the alternate settings profile. In some embodiments, when the auto-link functionality is disabled, the settings profile identification module 136 can query the vehicle manual-link control table 130 in order to determine the label of the settings profile that is linked to the label of the user's vehicle control account (that the user has provided credentials and logged into to access the application 114).

In an exemplary embodiment, upon querying the vehicle auto-link control table 128 and/or the vehicle manual link control table, the settings profile identification module 136 can retrieve the label of the linked settings profile. The settings profile identification module 136 can then provide the retrieved label to the vehicle control module 138 of the application 114. In one or more embodiments, when the vehicle control module 138 receives the label of the linked settings profile (that is determined by the settings profile identification module 136), the vehicle control module 138 can access the storage 116 of the head unit 110 to retrieve and apply (e.g., execute) the linked settings profile (data file). The vehicle control module 138 can then communicate the settings within the programmable code of the settings profile to the ECU 108. The ECU 108 can send one or more commands to one or more vehicle systems 106 in order to control the vehicle system(s) 106 to adjust one or more programmable settings per the linked settings profile. In an alternate embodiment, the vehicle control module 138 can send one or more commands directly from the controller of the head unit 110 to the one or more vehicle systems 106 in order to adjust corresponding programmable settings based on the one or more settings that are included as part of the determined settings profile.

Figure 3:
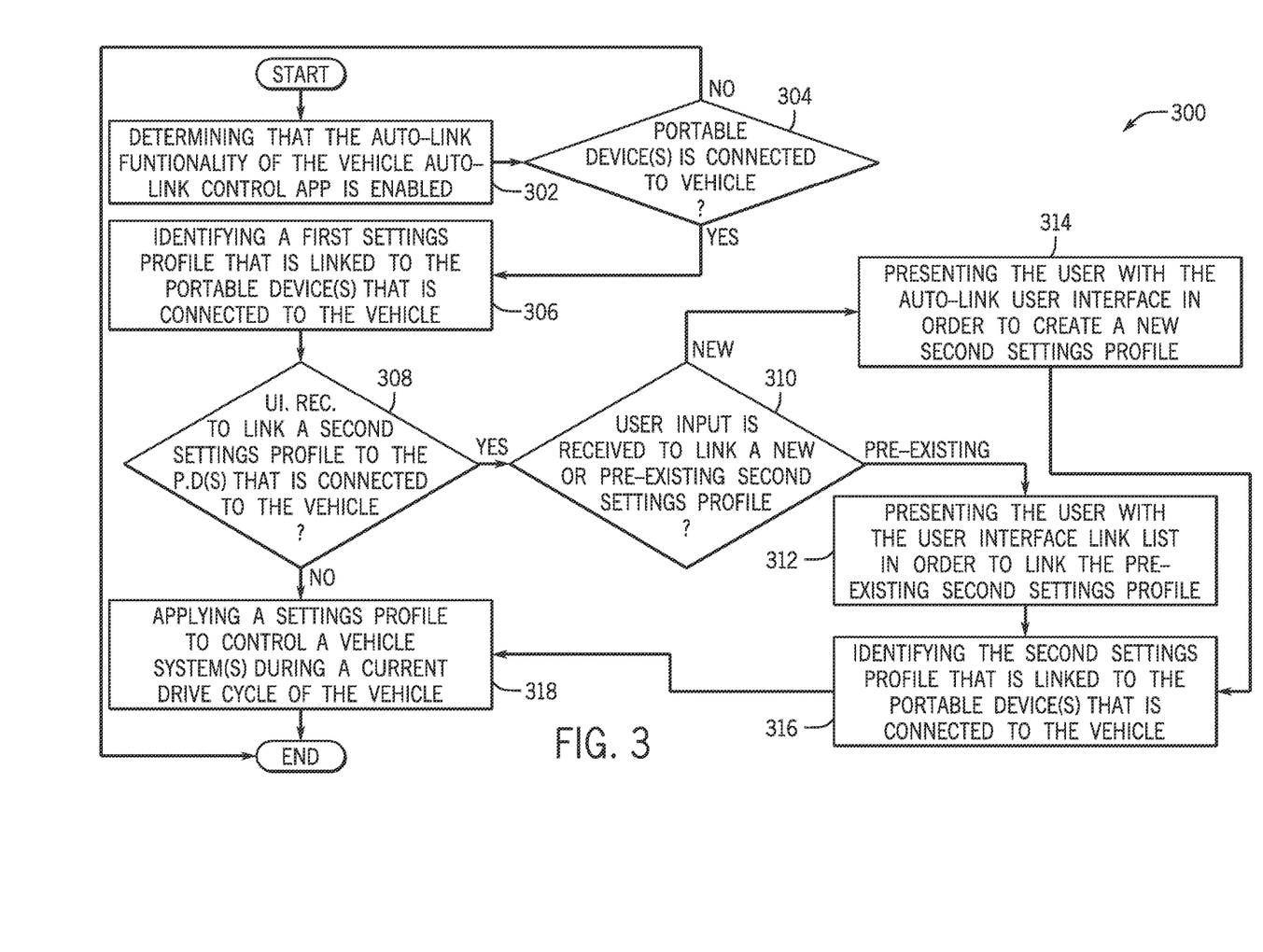
FIG. 3 is a process flow diagram of a method for determining and applying a settings profile to a vehicle using the vehicle auto-link control application when auto-link functionality is enabled, according to an exemplary embodiment.

Referring now to FIG. 3, a process flow diagram of a method 300 for determining and applying a settings profile to a vehicle 102 using the vehicle auto-link control application 114 when auto-link functionality is enabled is illustrated. FIG. 3 will be described with reference to the components of FIG. 1, though it is to be appreciated that the method of FIG. 3 can be used with other systems and/or components.

At block 302, the method includes determining an auto-link functionality of the vehicle auto-link control application 114 is enabled. Specifically, when the user enters the vehicle 102, the user can utilize the interface component 118 in order to login to his/her vehicle control account and access the vehicle auto-link control application 114. In one embodiment, upon launching the application 114, the auto-link interface module 130 can present the user with an auto-link ON/OFF user interface input icon on the auto-link user interface that allows the user to enable or disable the auto-link functionality of the vehicle auto-link control application 114. In other words, the user can choose if he/she would like his/her settings profile to be applied automatically based on the connection of the portable device(s) 104 to the vehicle 102. In one embodiment, when the user enables the auto-link functionality of the application 114, the auto-link interface module 132 determines that the auto-link functionality is enabled and the auto-link functionality remains in an enabled state for each drive cycle of the vehicle 102 until the user disables the auto-link functionality via the auto-link ON/OFF user interface input icon. In an exemplary embodiment, upon determining that the auto-link functionality is enabled, the auto-link interface module 130 sends a corresponding signal to the settings profile identification module 136.

At block 304, it is determined if the portable device(s) 104 is connected to the vehicle 102. Specifically, the auto-link interface module 132 can communicate with the communication unit 112 to determine if one or more portable device(s) 104 are connected to the vehicle 102. As described above, when the portable device(s) 104 connect to the vehicle 102, the communication unit 112 can receive the device ID(s) from the connected portable device(s) 104. Upon receipt of the device ID(s), the communication unit 112 can send the device ID(s) to the head unit 110 to be analyzed to determine if a matching device ID is included within the aforementioned portable device association list. When the head unit 110 determines that a matching device ID is included within the portable device association list, the portable device(s) 104 (with the matching device ID(s)) is determined to be an associated portable device(s) 104 that is connected to the vehicle 102.

If it is determined that the portable device(s) 104 is connected to the vehicle 102 (at block 304), at block 306, the method includes identifying a first settings profile that is linked to the portable device(s) 104 that is connected to the vehicle 102. In an exemplary embodiment, the settings profile identification module 136 accesses the database(s) 126 and performs a query on the vehicle auto-link control table 128 for the record(s) containing the device ID(s) of the connected portable device(s) 104. In one embodiment, the settings profile identification module 136 identifies the first settings profile that is linked to the connected portable device(s) 104 based on the label of the first settings profile that is retrieved within the record containing the device ID(s) of the connected portable device(s) 104. As an illustrative example, if the database record for the connected portable device(s) 104 contains a device ID and a linked label of the settings profile [Dev.ID=0002:SP.LBL=Mr. A's Profile], the settings profile identification module 136 can retrieve the label of the settings profile 'Mr. A's Profile' from the record upon performing a query on the vehicle auto-link control table 128 for the '0002' device ID (of the connected portable device(s) 104). Therefore, the settings profile identification module 136 can identify 'Mr. A's Profile' as the first settings profile that is linked to the portable device that is connected to the vehicle 102.

At block 308, the method includes determining if a user input is received to link a second settings profile to the portable device(s) 104 that is connected to the vehicle 102. In an exemplary embodiment, upon retrieving the label of the linked settings profile, the settings profile identification module 136 communicates with the auto-link interface module 132 to present a prompt to the user on the auto-link user interface. Specifically, the auto-link interface module 132 can present a prompt to the user that informs the user that the first settings profile that is linked to the connected portable device(s) 104 will be applied if the user input to link a second settings profile is not received within a predetermined amount of time (e.g., 15 seconds). In addition to the prompt, the auto-link interface module 132 can present an auto-link replace input icon that can be inputted by the user in order to link a second settings profile to the portable device(s) 104.

In an exemplary embodiment, the auto-link interface module 132 determines if the user inputs an auto-link replace icon within the predetermined amount of time to link the second settings profile to the portable device(s) 104 that is connected to the vehicle 102. The auto-link interface module 132 can communicate the determination of whether an input is or is not received on the auto-link replace icon to the settings profile identification module 136.

If it is determined that an input is not received to link a second settings profile to the portable device(s) 104 that is connected to the vehicle 102 (at block 308), the method proceeds to block 318, wherein the method includes applying a settings profile to control a vehicle system(s) 106 during a current drive cycle of the vehicle 102. In an exemplary embodiment, if the user does not input the auto-link replace icon within the predetermined time, the auto-link interface module 132 can communicate the non-input to the settings profile identification module 136. The settings profile identification module 136 can provide the label of first settings profile that was retrieved to the vehicle control module 138 based on the query on the vehicle auto-link control table 128 (provided at block 306). Upon receipt of the label of the first settings profile, the vehicle control module 138 can access the storage 116 of the head unit 110 in order to search, retrieve, and apply (e.g., execute) the first settings profile that corresponds to the label retrieved by the settings profile identification module 136. The vehicle control module 138 can communicate with the ECU 108 in order to control the one or more vehicle systems 106 per the applied first settings profile. The ECU 108 can send one or more commands to one or more vehicle systems 106 in order for the vehicle system(s) 106 to adjust corresponding programmable settings based on the one or more settings that are included as part of the determined first settings profile.

Referring back to the last example discussed above, in the instance that Mr. A is using the first portable device 104 within the vehicle 102 and his profile is linked to the first portable device 104 that is connected to the vehicle 102, Mr. A may not input the auto-link replace input icon to load another user's settings profile. If an input is not received to link a second settings profile to the first portable device 104, the vehicle control module 138 can apply Mr. A's settings profile stored on the storage 116 of the head unit 110 in order to adjust the programmable settings of the vehicle system(s) 106 per Mr. A's preferences.

Referring again to block 308, if it is determined that an input is received to link a second settings profile to the portable device(s) 104 that is connected to the vehicle 102, the method proceeds to block 310. At block 310, the method includes determining if the user input is received to link a new or pre-existing second settings profile. In one embodiment, if the auto-link interface module 132 communicates the input of the auto-link replace icon to the settings profile identification module 136, the auto-link interface module 132 can provide a prompt on the auto-link user interface for the user to link the new or pre-existing settings profile to the portable device(s) 104 that is connected to the vehicle 102. For instance, the auto-link interface module 132 can prompt the user to link the new or pre-existing settings profile by presenting the user with a new settings profile creation icon and a pre-existing settings profile linking icon.

If it is determined that the user input is received to link a pre-existing second settings profile (at block 310), at block 312, the method includes presenting the user with the user interface link list in order to link the pre-existing second settings profile. In one embodiment, upon presenting the auto-link user interface and receiving an input by the user to link his/her pre-existing settings profile to the portable device(s) 104, the auto-link interface module 132 can present the user with the user interface link list that is presented on the auto-link user interface. The user interface link list can present the list of one or more device IDs of one or more portable device(s) 104 associated to the vehicle 102 including the device ID(s) of the portable device(s) 104 that is connected to the vehicle 102. In addition, the user interface link list can also present the labels of one or more pre-existing settings profiles that are stored on the storage 116 of the head unit 110. The device ID(s) displayed on the user interface link list can be selected/inputted by the user to be linked to one of the labels of the per-existing settings profiles.

In an exemplary embodiment, when the user selects/inputs (his/her) settings profile to the device ID(s) of the portable device(s) 104 on the user interface link list, the auto-link interface module 132 can communicate a signal that indicates the linking selection/input to the settings profile linking module 134. Once the linking selection/input indication signal is received, the settings profile linking module 134 can access the database(s) 126 and provide a query on the vehicle auto-link control table 128 for the record(s) containing the device ID(s) of the portable device(s) 104 selected/inputted by the user on the user interface link list. In one embodiment, upon finding the record(s) containing the device ID(s) of the portable device(s) 104, the settings profile linking module 134 updates the record(s) by replacing the label of the first settings profile contained in the record(s) with the label of the second settings profile. In other words, the first settings profile is no longer linked to the portable device(s) 104.

Referring again to block 310, if it is determined that the input is received to link a new second settings profile, at block 314, the method includes presenting the user with the auto-link user interface in order to create a new second settings profile. In one embodiment, the auto-link interface module 132 can present a prompt on the auto-link user interface for the user to input his/her user credentials (username/passcode) in order to validate his/her vehicle control account that is logged in to access the vehicle auto-link control application 114. Upon the user logging into his/her vehicle control account, the auto-link interface module 132 can present the auto-link user interface for the user to create his/her settings profile with one or more preferences in order adjust the programmable settings of the vehicle system(s) 106. The user can then input the user interface link list to link his/her new settings profile to the device ID(s) of the one or more portable device(s) 104, as discussed.

In an exemplary embodiment, when the user selects/inputs (his/her) settings profile to the device ID(s) of the portable device(s) 104 on the user interface link list, the auto-link interface module 132 can communicate a signal that indicates the linking selection/input to the settings profile linking module 134. Once the linking selection/input indication signal is received, the settings profile linking module 134 can access the database(s) 126 and provide a query on the vehicle auto-link control table 128 for the record(s) containing the device ID(s) of the portable device(s) 104 selected/inputted by the user on the user interface link list. In one embodiment, upon finding the record(s) containing the device ID(s) of the portable device(s) 104, the settings profile linking module 134 can update the record(s) by replacing the label of the first settings profile with the label of the second (new) settings profile. In other words, as discussed above, the first settings profile is no longer linked to the portable device(s) 104.

Upon the user linking the pre-existing second settings profile (at block 312) or the user creating a new second settings profile (at block 314), the method proceeds to block 316, wherein the method includes identifying a second settings profile that is linked to the portable device(s) 104 that is connected to the vehicle 102. In one embodiment, the settings profile identification module 136 performs a query on the vehicle auto-link control table 128 and determines that the second (pre-existing or new) settings profile is linked to the connected portable device(s) 104 if the label of the second settings profile is retrieved within the record containing the device ID(s) of the connected portable device(s) 104.

At block 318, the method includes applying a settings profile to control a vehicle system(s) 106 during a current drive cycle of the vehicle 102. The settings profile identification module 136 can provide the label of the second settings profile that was retrieved from the vehicle auto-link table 128 to the vehicle control module 138 based on the query on the vehicle auto-link control table 128 (provided at block 316). Upon receipt of the label of the second settings profile, the vehicle control module 138 can access the storage 116 of the head unit 110 in order to search, retrieve, and apply (e.g., execute) the second settings profile that corresponds to the label retrieved by the settings profile identification module 136. In an exemplary embodiment, the vehicle control module 138 can communicate with the ECU 108 to control the one or more vehicle systems 106 per the second settings profile. The ECU 108 can send one or more commands to one or more vehicle systems 106 in order for the vehicle system(s) 106 to adjust programmable settings based on the one or more customized settings that are included as part of the second (pre-existing) settings profile.

Referring back to the example discussed above, if Mr. A's settings profile is linked to a first portable device 104 that is used by Mrs. A when she operates the vehicle 102, Mrs. A can input the user interface link list of the vehicle auto-link control application 114 to link her pre-existing/new settings profile to the first portable device 104. Once Mrs. A links her settings profile to the first portable device 104, whenever the first portable device 104 is used to access or operate the vehicle 102, the settings profile identification module 136 retrieves the label of Mrs. A's settings profile from the vehicle auto-link control table 128. The vehicle control module 138 can apply Mrs. A's settings profile stored on the storage 116 of the head unit 110 in order to adjust the programmable settings of the vehicle system(s) 106 per Mrs. A's preferences.

Figure 4:
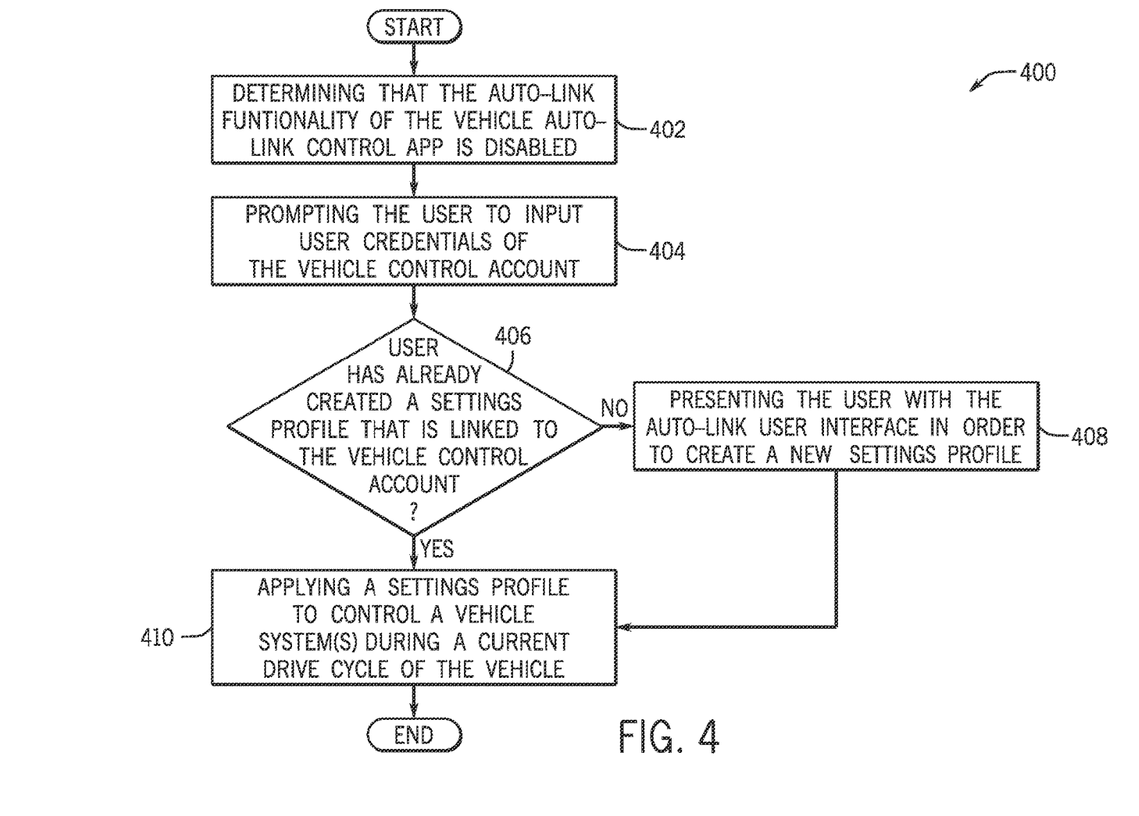
FIG. 4 is a process flow diagram of a method for determining and applying a settings profile to a vehicle using the vehicle auto-link control application when auto-link functionality is disabled, according to an exemplary embodiment.

Referring now to FIG. 4, a process flow diagram of a method 400 for determining and applying a settings profile to a vehicle 102 using the vehicle auto-link control application 114 when auto-link functionality is disabled is illustrated. FIG. 4 will be described with reference to the components of FIG. 1, though it is to be appreciated that the method of FIG. 4 can be used with other systems and/or components.

At block 402, the method includes determining that the auto-link functionality is disabled on the vehicle 102. Specifically, when the user enters the vehicle 102, the user can provide inputs through the interface component 118 to login to his/her vehicle control account in order to access the vehicle auto-link control application 114. As discussed above, upon launching the application 114, the auto-link interface module 132 can present the user with an auto-link ON/OFF user interface input icon on the auto-link user interface that allows the user to enable or disable the auto-link functionality of the vehicle auto-link control application 114. In one embodiment, when the user disables the auto-link functionality of the application 114, the auto-link interface module 132 determines that the auto-link functionality is disabled and the auto-link functionality remains in a disabled state for each drive cycle of the vehicle 102 until the user enables the auto-link functionality via the auto-link ON/OFF user interface input icon. In an exemplary embodiment, the auto-link interface module 132 sends a signal to the settings profile identification module 136 when the user disables the auto-link functionality on the user interface.

At block 404, the method includes prompting the user to input user credentials of the vehicle control account. In one embodiment, upon determining that the auto-link functionality is disabled by the user, the auto-link interface module 132 can present a prompt on the auto-link user interface for the user to input his/her user credentials (username/passcode) in order to validate his/her vehicle control account. Upon validating the user's vehicle control account, the settings profile identification module 136 can access the database(s) 126 and query the vehicle manual-link control table 130 for the label of the user's vehicle control account.

At block 406, the method includes determining if the user has already created a settings profile that is linked to the vehicle control account. In one embodiment, when the settings profile identification module 136 performs a query on the vehicle manual-link control table 130 and retrieves the label of the settings profile that is linked to the label of the vehicle control account within any record, it is determined that the user has already created a settings profile that is linked to the vehicle control account. On the other hand, when the settings profile identification module 136 performs a query on the vehicle manual-link control table 130 and can not find (nor retrieve) the label of the settings profile that is linked to the label of the vehicle control account within any record, it is determined that the user has not already created a settings profile that is linked to the vehicle control account. For example, if the record for a connected portable device(s) 104 contains a label of the vehicle control account and a linked label of the settings profile [VCALbl=Mr.A: SP.LBL=Mr. A's Profile], the settings profile identification module 136 can retrieve the label of the settings profile 'Mr. A's Profile' from the record upon performing a query on the vehicle manual-link control table 130 for the 'Mr.A' label of Mr. A's vehicle control account.

If it is determined that the user has already created a settings profile that is linked to the vehicle control account (at block 406), at block 410, the method includes applying a settings profile to control a vehicle system(s) 106 during a current drive cycle of the vehicle 102. In an exemplary embodiment, the settings profile identification module 136 can communicate with the vehicle control module 138 in order to provide the label of settings profile that was retrieved within the record containing the label of the user's vehicle control account on the vehicle manual-link control table 130. Upon receipt of the label of the settings profile, the vehicle control module 138 can access the storage 116 of the head unit 110 in order to search, retrieve, and apply (e.g., execute) the settings profile that corresponds to the label retrieved by the settings profile identification module 136. The vehicle control module 138 can communicate with the ECU 108 to control the one or more vehicle systems 106 per the settings profile determined by the settings profile identification module 136. For example, if Mr. A's logs into his vehicle control account in order to apply his settings profile, the vehicle control module 138 can apply Mr. A's settings profile stored on the storage 116 of the head unit 110 in order to adjust the programmable settings of the vehicle system(s) 106 per Mr. A's preferences.

Referring back to block 406, if it is determined that the user had not already created a settings profile that is linked to the vehicle control account, the method proceeds to block 408, wherein the method includes presenting the user with the auto-link user interface in order to create a new settings profile. In one embodiment, upon querying the vehicle manual-link control table 130, if the settings profile identification module 136 does not retrieve the label of the user's settings profile that is linked to the label of the user's vehicle control account, the settings profile identification module 136 can send a corresponding signal to the auto-link interface module 132. Upon receiving the signal sent from the settings profile identification module 136, the auto-link interface module 132 can present the user with the auto-link interface in order for the user to create a new settings profile and link the settings profile to his/her vehicle control account. Once the user's settings profile is linked to his/her vehicle control account, the settings profile linking module 134 can access the database(s) 126 and can create the new database record containing the label of the user's vehicle control account that is linked to the label of the user's settings profile on the vehicle manual-link table 130. (e.g., [VCALbl=Mrs.A:SP.LBL=Mrs. A's Profile]).

At block 410, the method includes applying a settings profile to control a vehicle system(s) 106 during a current drive cycle of the vehicle 102. In an exemplary embodiment, upon creating the record containing the label of the user's vehicle control account, the settings profile linking module 134 can communicate the label of the linked settings profile to the settings profile identification module 136 and/or the vehicle control module 138. In one embodiment, upon receipt of the label of the user's new settings profile, the vehicle control module 138 can access the storage 116 of the head unit 110 in order to search, retrieve, and apply (e.g., execute) the user's new settings profile in order for the vehicle system(s) 106 to adjust corresponding programmable settings based on the one or more settings that are included as part of the user's new settings profile.

As discussed, various embodiments of the settings profile auto-link system 100 can be used. In addition, numerous components and technologies that have not been discussed herein can be used to compute operations associated with the vehicle auto-link control application 114 and to adjust the programmable settings of the vehicle system(s) 106 per the user's preferences. It is to be appreciated that in addition of one or more portable devices 104, the vehicle auto-link control application 114 can be utilized with different types of devices that are in production and that are not yet in production.

The embodiments discussed herein can also be described and implemented in the context of computer-readable storage medium storing computer-executable instructions. Computer-readable storage media includes computer storage media and communication media. For example, flash memory drives, digital versatile discs (DVDs), compact discs (CDs), floppy disks, and tape cassettes. Computer-readable storage media can include volatile and nonvolatile, removable and non-removable media implemented in any method or technology for storage of information such as computer readable instructions, data structures, modules or other data. Computer readable storage media excludes non-transitory tangible media and propagated data signals.

It will be appreciated that various implementations of the above-disclosed and other features and functions, or alternatives or varieties thereof, can be desirably combined into many other different systems or applications. Also that various presently unforeseen or unanticipated alternatives, modifications, variations, or improvements therein can be subsequently made by those skilled in the art which are also intended to be encompassed by the following claims.

The invention claimed is:

1. A computer-implemented method for applying vehicle settings to a vehicle, comprising:

determining by a processor if a portable device is connected to the vehicle;

enabling automatically by the processor an auto-link functionality on the vehicle, to apply a first settings profile or a second settings profile associated with the portable device to the vehicle, based on a connection of the portable device to the vehicle;

determining by the processor if a user input is received to disable the auto-link functionality on the vehicle;

identifying automatically by the processor the first settings profile that is linked to the portable device that is connected to the vehicle when the auto-link functionality is enabled on the vehicle based on the connection of the portable device to the vehicle, determining by the processor if a user input is received to link the second settings profile to the portable device that is connected to the vehicle;

identifying by the processor the second settings profile upon determining that the user input is received to link the second settings profile to the portable device that is connected to the vehicle; and applying by the processor the first settings profile or the second settings profile to control a vehicle system during a current drive cycle of the vehicle, wherein applying the first settings profile or the second settings profile of the auto-link functionality to control the vehicle system includes executing by the processor, system instructions included within the first settings profile when the first settings profile is identified to control the vehicle system to adjust at least one programmable setting of the vehicle system based on the first settings profile, and executing by the processor, system instructions included within the second settings profile when the second settings profile is identified to adjust the at least one programmable setting of the vehicle system based on the second settings profile by adjusting a seating position of a seat, a mirror position of a mirror, a seat belt height of a seat belt, a steering wheel height of a steering wheel, or a pedal position of a pedal, wherein identifying the first settings profile includes receiving a device ID from the portable device that is connected to the vehicle, accessing a vehicle auto-link database table, querying the vehicle auto-link database table for a record containing the device ID of the portable device, and retrieving a label of the first settings profile that is linked to the device ID of the portable device from the record containing the device ID of the portable device; and identifying the first settings profile that is linked to a vehicle control account used to login to a vehicle auto-link control application upon determining that the auto-link functionality is disabled on the vehicle, wherein identifying the first settings profile that is linked to the vehicle control account includes receiving user credentials of the vehicle control account, accessing a vehicle manual-link database table, querying the vehicle manual-link database table for a label of the vehicle control account, and retrieving the label of the first settings profile linked to the label of the vehicle control account.

2. The computer-implemented method of claim 1, wherein determining if the user input is received to link the second settings profile to the portable device that is connected to the vehicle includes determining if the user input is received to link at least one of: a pre-existing second settings profile to the portable device and a new second settings profile to the portable device.

3. The computer-implemented method of claim 2, further including linking the second settings profile to the portable device when it is determined that the user input is received to link the second settings profile to the portable device that is connected to the vehicle, wherein linking the second settings profile to the portable device includes accessing the vehicle auto-link database table, querying the vehicle auto-link database table for the record containing the device ID of the portable device that is connected to the vehicle, and overwriting a record that contains the label of the first settings profile with a label of the second settings profile by replacing the label of the first settings profile with the label of the second settings profile, wherein the label of the second settings profile is at least one of: a label of the pre-existing settings profile and a label of the new settings profile.

4. The computer-implemented method of claim 3, wherein identifying the second settings profile includes accessing the vehicle auto-link database table and retrieving the label of the second settings profile within the record containing the device ID of the portable device on the vehicle auto-link database table.

5. The computer-implemented method of claim 1, wherein applying the first settings profile or the second settings profile to control the vehicle system includes accessing at least one of the first settings profile or the second settings profile on a head unit of the vehicle that corresponds to a label of at least one of: the first settings profile and the second settings profile, wherein at least one of the first settings profile or the second settings profile on the head unit of the vehicle is executed to control the vehicle system during the current drive cycle of the vehicle.

6. A system for applying vehicle settings to a vehicle, comprising:
   a vehicle auto-link control application that is executed on a head unit of the vehicle that includes a processor and a memory storing instructions in a form of executable code that when executed by the processor cause the processor to:
   determine if a portable device is connected to the vehicle;
   enable automatically an auto-link functionality on the vehicle, to apply a first settings profile or a second settings profile associated with the portable device to the vehicle, based on a connection of the portable device to the vehicle;
   determine if a user input is received to disable the auto-link functionality on the vehicle;
   identify the first settings profile is linked to the portable device that is connected to the vehicle when the auto-link functionality is enabled on the vehicle based on the connection of the portable device to the vehicle,
   wherein the processor determines if a user input is received to link the second settings profile to the portable device that is connected to the vehicle and identifies the second settings profile upon determining that the user input is received to link the second settings profile to the portable device that is connected to the vehicle; and
   apply the first settings profile or the second settings profile to control a vehicle system during a current drive cycle of the vehicle,
   wherein applying the first settings profile or the second settings profile of the auto-link functionality to control the vehicle system includes executing system instructions included within the first settings profile when the first settings profile is identified to control the vehicle system to adjust at least one programmable setting of the vehicle system based on the first settings profile, and executing system instructions included within the second settings profile when the second settings profile is identified to adjust the at least one programmable setting of the vehicle system based on the second settings profile, wherein the adjusting the programmable setting includes adjusting a seating position of a seat, a mirror position of a mirror, a seat belt height of a seat belt, a steering wheel height of a steering wheel, or a pedal position of a pedal.

7. The system of claim 6, wherein a device ID is received from the portable device, a vehicle auto-link database table is accessed and queried for a record containing the device ID of the portable device, and a label of the first settings profile is retrieved that is linked to the device ID of the portable device from the record containing the device ID of the portable device.

8. The system of claim 6, wherein it is determined if the user input is received to link at least one of: a pre-existing second settings profile to the portable device and a new second settings profile to the portable device.

9. The system of claim 8, wherein the second settings profile is linked to the portable device when it is determined that the user input is received to link the second settings profile to the portable device that is connected to the vehicle, wherein the vehicle auto-link database table is accessed and queried for the record containing the device ID of the portable device that is connected to the vehicle, and a record of the vehicle auto-link database table that contains the label of the first settings profile is overwritten with a label of the second settings profile by replacing the label of the first settings profile with the label of the second settings profile, wherein the label of the second settings profile is at least one of: a label of the pre-existing settings profile and a label of the new settings profile.

10. The system of claim 9, wherein the vehicle auto-link database table is accessed to retrieve the label of the second settings profile within the record containing the device ID of the portable device on the vehicle auto-link database table.

11. The system of claim 7, wherein the first settings profile that is linked to a vehicle control account is identified upon determining that the auto-link functionality is disabled on the vehicle, wherein user credentials for the vehicle control account are received and a vehicle manual-link database table is accessed and queried for a label of the vehicle control account and the label of the first settings profile linked to the label of the vehicle control account is retrieved.

12. The system of claim 6, wherein the first settings profile or the second settings profile on the head unit of the vehicle is accessed that corresponds to a label of at least one of: the first settings profile and the second settings profile, wherein at least one of the first settings profile or the second settings profile on the head unit of the vehicle is executed in order to control the vehicle system during the current drive cycle of the vehicle.

13. A non-transitory computer-readable storage medium storing instructions in a form of executable code for applying vehicle settings to a vehicle that, when executed by a processor of a computer, causes the processor of the computer to perform a method, comprising:

determining if a portable device is connected to the vehicle;

enabling automatically an auto-link functionality on the vehicle, to apply a first settings profile or a second setting profile associated with the portable device to the vehicle, based on a connection of the portable device to the vehicle;

determining if a user input is received to disable the auto-link functionality on the vehicle;

identifying the first settings profile that is linked to the portable device that is connected to the vehicle when the auto-link functionality is enabled on the vehicle based on the connection of the portable device to the vehicle, determining if a user input is received to link the second settings profile to the portable device that is connected to the vehicle;

identifying the second settings profile upon determining that the user input is received to link the second settings profile to the portable device that is connected to the vehicle; and applying the first settings profile or the second settings profile to control a vehicle system during a current drive cycle of the vehicle, wherein applying the first settings profile of the auto-link functionality to control the vehicle system includes executing system instructions included within the first settings profile when the first settings profile is identified to control the vehicle system to adjust at least one programmable setting of the vehicle system based on the first settings profile, and executing system instructions included within the second settings profile when the second settings profile is identified to adjust the at least one programmable setting of the vehicle system based on the second settings profile by adjusting a seating position of a seat, a mirror position of a mirror, a seat belt height of a seat belt, a steering wheel height of a steering wheel, or a pedal position of a pedal.

14. The non-transitory computer-readable storage medium of claim 13, wherein identifying the first settings profile includes receiving a device ID from the portable device that is connected to the vehicle, accessing a vehicle auto-link database table, querying the vehicle auto-link database table for a record containing the device ID of the portable device, and retrieving a label of the first settings profile that is linked to the device ID of the portable device from the record containing the device ID of the portable device.

15. The non-transitory computer-readable storage medium of claim 13, wherein determining if the user input is received to link the second settings profile to the portable device that is connected to the vehicle includes determining if the user input is received to link at least one of: a pre-existing second settings profile to the portable device and a new second settings profile to the portable device.

16. The non-transitory computer-readable storage medium of claim 15, further including linking the second settings profile to the portable device when it is determined that the user input is received to link the second settings profile to the portable device that is connected to the vehicle, wherein linking the second settings profile to the portable device includes accessing the vehicle auto-link database table, querying the vehicle auto-link database table for the record containing the device ID of the portable device that is connected to the vehicle, and overwriting a record that contains the label of the first settings profile with the label of the second settings profile by replacing the label of the first settings profile with the label of the second settings profile, wherein the label of the second settings profile is at least one of: a label of the pre-existing settings profile and a label of the new settings profile.

17. The non-transitory computer-readable storage medium of claim 16, wherein identifying the second settings profile includes accessing the vehicle auto-link database table and retrieving the label of the second settings profile within the record containing the device ID of the portable device on the vehicle auto-link database table.

18. The non-transitory computer-readable storage medium of claim 14, further including identifying the first settings profile that is linked to a vehicle control account upon determining that the auto-link functionality is disabled on the vehicle, wherein identifying the first settings profile that is linked to the vehicle control account includes receiving user credentials of the vehicle control account, accessing a vehicle manual-link database table, querying the vehicle manual-link database table for a label of the vehicle control account, and retrieving the label of the first settings profile linked to the label of the vehicle control account.

* * * * *